United States Patent
Inoue et al.

(10) Patent No.: US 10,501,361 B2
(45) Date of Patent: Dec. 10, 2019

(54) OPTICAL FIBER PREFORM MANUFACTURING METHOD AND OPTICAL FIBER PREFORM MANUFACTURING DEVICE

(75) Inventors: Dai Inoue, Ibaraki (JP); Takaaki Nagao, Ibaraki (JP); Hiroyuki Koide, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1032 days.

(21) Appl. No.: 13/006,311

(22) Filed: Jan. 13, 2011

(65) Prior Publication Data

US 2011/0107797 A1    May 12, 2011

Related U.S. Application Data

(63) Continuation of application No. PCT/JP2009/003385, filed on Jul. 17, 2009.

(30) Foreign Application Priority Data

Jul. 18, 2008 (JP) ................................ 2008-187918
Jul. 16, 2009 (JP) ................................ 2009-168138

(51) Int. Cl.
    *C03B 37/014* (2006.01)
(52) U.S. Cl.
    CPC ...... *C03B 37/01413* (2013.01); *C03B 37/014* (2013.01); *C03B 2201/31* (2013.01); *C03B 2207/70* (2013.01); *Y02P 40/57* (2015.11)
(58) Field of Classification Search
    CPC ........................... C03B 2207/70; C03B 37/014
    See application file for complete search history.

(56) References Cited

U.S. PATENT DOCUMENTS 4,801,322 A * 1/1989 Suda et al. ............... 65/144
5,676,725 A   10/1997 Ito et al.
(Continued)

FOREIGN PATENT DOCUMENTS

CN      1424270 A      6/2003
JP    H1-239033 A      9/1989
(Continued)

OTHER PUBLICATIONS

International Search Report (ISR) issued in PCT/JP2009/003385 (parent application) dated Oct. 2009 for Examiner consideration.
(Continued)

*Primary Examiner* — John M Hoffmann

(57) ABSTRACT

An optical fiber base material manufacturing method includes: supplying oxygen, hydrogen, and silicide to a core deposition burner; depositing silicon dioxide; adjusting a drawing up speed so that a deposition tip position remains at the same position in accordance with growth of a porous base material; calculating an average of the drawing up speed at each preset time interval; calculating a difference of the calculated average from a preset value of the drawing up speed; correcting a flow rate of silicon tetrachloride when the supplied hydrogen is hydrogen produced or stored at normal temperature, and correcting a flow rate of hydrogen when the supplied hydrogen is hydrogen obtained by vaporizing liquid hydrogen, where when correcting the flow rate of hydrogen, a flow rate of hydrogen supplied to a cladding deposition burner is also corrected in a ratio of before and after the correction of the flow rate of the hydrogen.

20 Claims, 7 Drawing Sheets

(56) References Cited

U.S. PATENT DOCUMENTS

| | | | |
|---|---|---|---|
| 6,664,801 B1* | 12/2003 | Palusa | 324/762.09 |
| 6,834,516 B2* | 12/2004 | Jablonowski et al. | 65/389 |
| 7,409,835 B2* | 8/2008 | Briglia et al. | 62/648 |
| 2004/0007025 A1* | 1/2004 | Gotoh et al. | 65/384 |
| 2007/0062220 A1* | 3/2007 | Bang et al. | 65/377 |
| 2007/0084248 A1* | 4/2007 | Kim et al. | 65/384 |
| 2007/0137256 A1* | 6/2007 | Barish et al. | 65/415 |
| 2007/0271961 A1 | 11/2007 | Inoue et al. | |

FOREIGN PATENT DOCUMENTS

| | | | |
|---|---|---|---|
| JP | H3-242341 A | | 10/1991 |
| JP | 2000-34131 A | | 2/2000 |
| JP | 2000-351634 A | | 12/2000 |
| JP | 2001-287922 A | | 10/2001 |
| JP | 2005-075682 A | | 3/2005 |
| JP | 2006-193360 A | | 7/2006 |
| WO | WO 2006/075438 | * | 7/2006 |

OTHER PUBLICATIONS

Written Opinion (PCT/ISA/237) issued in PCT/JP2009/003385 (parent application) dated Oct. 2009.

European Search Report dated Nov. 2, 2011, in a counterpart European patent application No. 09797727.6 for Examiner consideration citing US2007/271961 which has been submitted in a previous IDS.

* cited by examiner

OPTICAL FIBER PREFORM MANUFACTURING METHOD AND OPTICAL FIBER PREFORM MANUFACTURING DEVICE

The contents of the following Japanese patent applications are incorporated herein by reference,
No. 2008-187918 filed on Jul. 18, 2008 and
No. 2009-168138 filed on Jul. 16, 2009.

BACKGROUND

1. Technical Field

The present invention relates to an optical fiber base material manufacturing method and an optical fiber base material manufacturing apparatus, for manufacturing an optical fiber base material in an oxyhydrogen flame by means of hydrolysis particularly by using hydrogen obtained by vaporizing the liquid hydrogen.

2. Related Art

Hydrogen supply equipment that stores liquid hydrogen in a low-temperature reservoir, vaporizes it by raising its temperature, and supplies it to the equipment at the later stage has already been put to practical use. For example, such equipment is utilized for manufacturing highly pure quartz glass, which involves a VAD method or an OVD method. In both of these methods, silicide such as silicon tetrachloride ($SiCl_4$) is supplied to an oxyhydrogen flame resulting from burning of hydrogen and oxygen by a burner, to generate silicon dioxide ($SiO_2$) by means of hydrolysis, the result is deposited to generate a porous base material, and the porous base material is heated using an electric furnace thereby obtaining transparent highly pure quartz glass.

When manufacturing an optical fiber preform made up of a core high in refractive index and a cladding lower in refractive index than the core using a VAD method, germanium is often added to the core deposition burner as an additive so as to enhance the refractive index of the quartz glass. Germanium is added in the form of compound such as $GeCl_4$. $GeCl_4$ undergoes hydrolysis in the oxyhydrogen flame, to generate $GeO_2$. $SiCl_4$ or $GeCl_4$, in the liquid form at normal temperature, is supplied either after vaporized by subjecting it to the carrier gas bubbling or after heated up to a temperature higher than the boiling point for direct vaporization.

Here, hydrogen supplied to a burner may be produced or stored at normal temperature, and liquid hydrogen may be used as backup hydrogen in case of stop of the normal hydrogen supply to a burner. There is also an alternative method in which all the hydrogen supply is made up of vaporized liquid hydrogen. In the manufacturing equipment adopting the VAD method or the OVD method, the flow rate of the gas to the burner is controlled using a mass flow controller (MFC).

In the VAD method, an optical fiber base material is manufactured by forming a porous base material by depositing glass particles generated in the flame hydrolysis on a rotating starting member, heating the porous base material in the heating furnace to about 1500 degrees centigrade to yield transparent quartz glass. During the depositing process, the deposition tip position of the porous base material is detected, for the purpose of adjusting the drawing up speed in accordance with the growth of the porous base material. Here, based on the finding that optical fiber base materials having a desirable refractive index distribution can be stably generated if the drawing up speed is maintained constant during the deposition process, the deviation from the set value of the drawing up speed is detected at each preset time interval, for correcting the flow rate of the raw material gas such as $SiCl_4$ depending on the detected deviation, as disclosed in Patent Document No. 1. In Patent Document No. 2, for maintaining the drawing up speed constant, the hydrogen amount control is only performed on the cladding burner that is adjacent to the burner for the core, from among a plurality of cladding burners. Patent Document No. 1: Japanese Patent Application Publication No. H1-239033 Patent Document No. 2: Japanese Patent Application Publication No. H3-242341

When the VAD apparatus normally utilizing hydrogen produced at normal temperature has switched to hydrogen obtained by vaporizing liquid hydrogen when the normal hydrogen supply has stopped, the drawing up speed is unintentionally raised by about 2% and the core diameter is narrowed. Even when hydrogen obtained by vaporizing liquid hydrogen is usually used, the drawing up speed has changed according to the usage amount of the vaporized liquid hydrogen, to cause the core diameter to fluctuate. Patent Document No. 2 is a technology to perform hydrogen amount correction only to the burner adjacent to the core, so as to change the temperature of the core to change the drawing up speed as well as to correct the growing speed of the cladding, and is not designed to take into consideration the actual flow amount for both of these different origins of hydrogen. In Patent Document No. 2, normal gaseous hydrogen is used, and not the hydrogen obtained by vaporizing liquid hydrogen. Therefore, when using the hydrogen obtained by vaporizing liquid hydrogen instead, in the technology of Patent Document No. 2, the cladding growing speed substantially fluctuates even if the drawing up speed is maintained stable, to cause a problem of being unable to maintain the thickness of the cladding stable.

The change in flow rate of the hydrogen gas has a remarkable adverse effect on the optical characteristics of the resulting optical fiber base material manufactured in the VAD method, preventing stable generation of optical fiber base materials having a desirable refractive index distribution and leading to increase in ratio of defective products.

SUMMARY

Therefore, it is an object of an aspect of the innovations herein to provide an optical fiber base material manufacturing method and an optical fiber base material manufacturing apparatus, which are capable of overcoming the above drawbacks accompanying the related art. The above and other objects can be achieved by combinations described in the claims.

So as to solve the above-stated problem, an aspect of the innovations may be an optical fiber base material manufacturing method for sequentially depositing glass particles on a tip of a starting material drawn up while being rotated in a VAD method, the optical fiber base material manufacturing method includes: supplying oxygen, hydrogen, and silicide to a core deposition burner; sequentially depositing, on the tip of the starting material, silicon dioxide generated in an oxyhydrogen flame by means of hydrolysis; adjusting a drawing up speed so that a deposition tip position remains at the same position in accordance with growth of a porous base material; calculating an average of the drawing up speed at each preset time interval; calculating a difference of the calculated average from a preset value of the drawing up speed; correcting a flow rate of silicon tetrachloride supplied to the core deposition burner depending on the difference when the supplied hydrogen is hydrogen produced or stored at normal temperature, and correcting a flow rate of hydrogen supplied to the core deposition burner depending on the difference when the supplied hydrogen is hydrogen obtained by vaporizing liquid hydrogen, where when correcting the flow rate of hydrogen, a flow rate of hydrogen supplied to a cladding deposition burner is also corrected in a ratio that is the same as a ratio of before and after the correction of the flow rate of the hydrogen supplied to the core deposition burner.

The optical fiber base material manufacturing method may supply a germanium compound to the core deposition burner as an additive. The silicide may be obtained by heating, to be vaporized, silicon tetrachloride to a temperature that is the same as or higher than a boiling point. The germanium compound may be obtained by heating, to be vaporized, germanium tetrachloride to a temperature that is the same as or higher than a boiling point.

Hydrogen of the same origin may be supplied to both of the core deposition burner and the cladding deposition burner. The flow rate of the hydrogen supplied to the core deposition burner and the cladding deposition burner may be controlled by a flow rate control apparatus whose measurement principle is based on thermal capacity measurement of gas. The flow rate control apparatus whose measurement principle may be based on thermal capacity measurement of gas is a mass flow controller.

Another aspect of the innovations may be an optical fiber base material manufacturing apparatus for sequentially depositing glass particles on a tip of a starting material drawn up while being rotated in a VAD method, the optical fiber base material manufacturing apparatus including: silicon tetrachloride supply equipment; first hydrogen supply equipment that supplies hydrogen produced or stored at normal temperature; second hydrogen supply equipment that vaporizes and supplies at least liquid hydrogen; a mechanism that adjusts a drawing up speed in accordance with growth of a base material so that a deposition tip position always remain at the same position; and a control section that calculates an average of the drawing up speed at each preset time interval, calculates a difference of the calculated average from a preset value of the drawing up speed, and has 1) Mode for correcting a flow rate of silicon tetrachloride supplied to a core deposition burner depending on the difference and 2) Mode for correcting a flow rate of hydrogen supplied to the core deposition burner depending on the difference, where the control section utilizes 1) Mode for correcting a flow rate of silicon tetrachloride, for supplying hydrogen from the first hydrogen supply equipment, and utilizes 2) Mode for correcting a flow rate of hydrogen, for supplying hydrogen from the second hydrogen supply equipment, and in 2) Mode for correcting a flow rate of hydrogen, the control section corrects a flow rate of hydrogen supplied to a cladding deposition burner in a ratio that is the same as a ratio of before and after the correction of the flow rate of the hydrogen supplied to the core deposition burner.

The flow rate of hydrogen supplied to the core deposition burner and the cladding deposition burner may be controlled by a flow rate control apparatus whose measurement principle is based on thermal capacity measurement of gas. The flow rate control apparatus whose measurement principle may be based on thermal capacity measurement of gas is a mass flow controller.

The optical fiber base material manufacturing apparatus may further include a detecting section that detects switching of supplied hydrogen between hydrogen produced or stored at normal temperature and hydrogen obtained by vaporizing liquid hydrogen, where the control section switches the mode to use, in response to the switching detected by the detecting section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Figure 1:
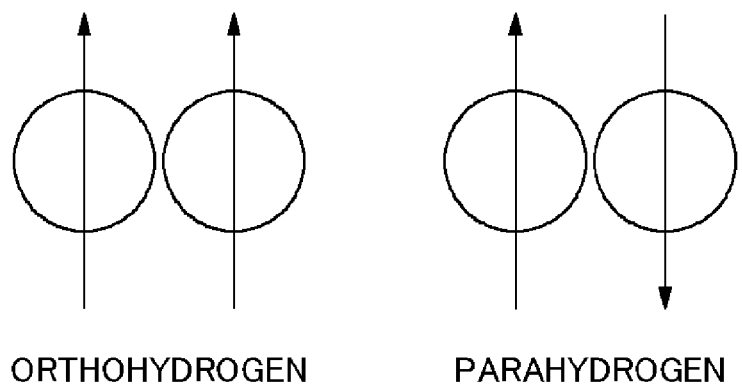
FIG. 1 is a schematic diagram of the state of spins of orthohydrogen and parahydrogen.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. When the VAD apparatus normally utilizing hydrogen produced at normal temperature has switched to hydrogen obtained by vaporizing liquid hydrogen, the drawing up speed is unintentionally raised by about 2% and the core diameter is narrowed. After examining this phenomenon, it is found that this reduction in diameter of the core and the increase in drawing up speed correspond to the change when decreasing the flow rate of hydrogen by about 1% without changing the flow rage of silicon tetrachloride ($SiCl_4$). Note that the drawing up speed is largely determined by the flow rates of $SiCl_4$ and hydrogen supplied to the core deposition burner, and the size of the core diameter is largely determined by the flow rate of hydrogen supplied to the core deposition burner.

When supplied to the MFC, the pressure and the temperature of the hydrogen was maintained substantially the same level before and after switch of the hydrogen produced at normal temperature and the liquid hydrogen, and hardly any difference was found in purity and impurity concentration for these two types of hydrogen that would lead to the mentioned change in flow rate of hydrogen. Even when usually using hydrogen obtained by vaporizing liquid hydrogen, the drawing up speed has changed according to the usage amount of the liquid hydrogen, to change the actual flow rate of hydrogen.

In view of this, the inventors of the present invention have focused on the existence of the isomer of a hydrogen molecule. A hydrogen molecule has two types of isomers whose nuclear spin is different from each other as schematically shown in FIG. 1. A hydrogen molecule is a 2 atom molecule and so has two protons. A type of hydrogen whose two protons have the same direction of spin is referred to as orthohydrogen, and a type of hydrogen whose two protons have opposite directions of spins to each other is referred to as parahydrogen.

Figure 2:
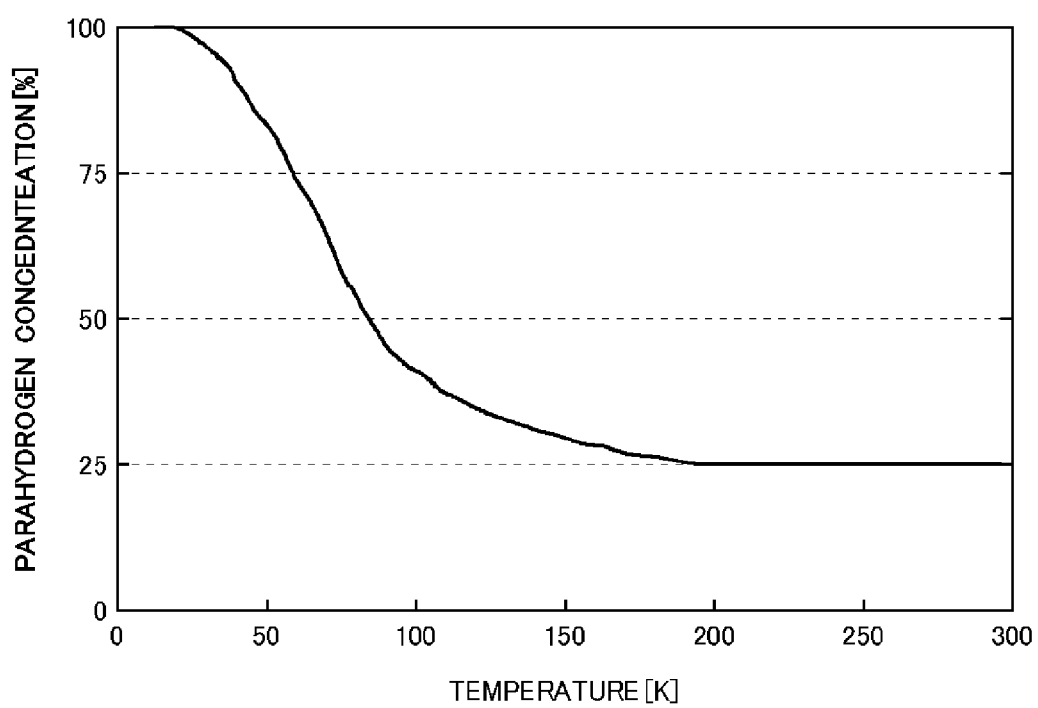
FIG. 2 shows the concentration of equilibrium parahydrogen in each temperature, where the longitudinal axis represents the parahydrogen concentration in % and the lateral axis represents the temperature in K.

FIG. 2 shows the concentration of equilibrium parahydrogen in each temperature, which specifically shows that the ratio of orthohydrogen and parahydrogen is 3:1 in the equilibrium state at normal temperature of 200K or higher, while in the equilibrium state in the vicinity of the boiling point of liquid hydrogen, i.e., around 20K, most of the hydrogen is parahydrogen. Here, the hydrogen having ortho and para in the equilibrium state is referred to as "normal hydrogen." The conversion from orthohydrogen to parahydrogen is gradual, and since it is an exothermal reaction, if hydrogen at normal temperature is converted to liquid hydrogen without changing the ratio between orthohydrogen and parahydrogen, the conversion from orthohydrogen to parahydrogen progresses in the low-temperature reservoir, to cause heat generation, thereby evaporating a large amount of liquid hydrogen.

To prevent such a reaction and to enable storage of liquid hydrogen in the stable state, a conventional method normally adopted is to facilitate ortho/para conversion during the liquefaction process of hydrogen, to produce, transport, and store liquid hydrogen mostly comprised of parahydrogen. Note that orthohydrogen and parahydrogen differ from each other in materials properties. For example, the constant pressure specific heat at 0 degree centigrade is 30.35 J/(mol*K) for parahydrogen, and 28.59 J/(mol*K) for normal hydrogen, which is about 6% difference.

The MFC used to control the flow rate of hydrogen is a thermal type and performs control by measuring the thermal capacity of a fluid passing therethrough. Therefore for fluids having different specific heat from each other, the MFC ensures accuracy of the flow rate by adopting respectively different conversion factors. Therefore, if an MFC adapted to the conversion factor for normal hydrogen is used to control the flow rate of hydrogen whose parahydrogen is higher in concentration than the normal hydrogen, it is found that the actual flow rate is reduced by the range of 0-6% compared to the normal hydrogen. In one example, when the concentration of parahydrogen is about 37%, the actual flow rate of this hydrogen is confirmed to be reduced by about 1% compared to the normal hydrogen. Such change in actual flow rate of hydrogen has an adverse effect on the optical characteristics of the resulting product of manufacture, to lead to increase in ratio of defective products.

Even in a case where hydrogen obtained by vaporizing liquid hydrogen is usually used, when the usage amount of the vaporized liquid hydrogen is changed, the time required after vaporization of the hydrogen to arrival at the MFC accordingly changes, to yield different levels of para/ortho conversion, which will change the concentration of parahydrogen at the arrival of the MFC. If this happens, the actual flow rate of hydrogen changes according to the change in concentration of parahydrogen, for the same reason stated above in the above case.

It is possible to store the normal hydrogen as liquid hydrogen, so as to prevent such change in actual flow rate of hydrogen. However, this method involves restricting conversion of orthohydrogen into parahydrogen by means of applying magnetic field, and so has to provide, in addition to the low-temperature reservoir associated with the liquid hydrogen manufacturing equipment, an apparatus to apply substantially the same magnetic field to all of the conveyance tanker, the low-temperature reservoir and so on associated with the hydrogen supply equipment, which is not practical from cost point of view.

In view of the above finding, the present embodiment calculates the average of the drawing up speed at each preset time interval, calculates the difference between the calculated drawing up speed average and a preset value of drawing up speed, set to the control apparatus, in advance, 1) Mode for correcting the flow rate of silicon tetrachloride supplied to the core deposition burner depending on the difference and 2) Mode for correcting the flow rate of hydrogen supplied to the core deposition burner depending on the difference, thereby correcting the flow rate of silicon tetrachloride when the supplied hydrogen is hydrogen produced or stored at normal temperature, and correcting the flow rate of hydrogen when the supplied hydrogen is hydrogen obtained by vaporizing liquid hydrogen, and in 2) Mode for correcting the flow rate of hydrogen, the flow rate of hydrogen supplied to the cladding deposition burner is also corrected in the ratio that is the same as the ratio of before and after the correction of the flow rate of the hydrogen supplied to the core deposition burner.

As a result, even when switching to the backup hydrogen obtained by vaporizing liquid hydrogen is performed or when the flow rate of the hydrogen whose origin is liquid hydrogen is changed, the actual flow rates of hydrogen supplied to the core deposition burner and the cladding deposition burner can be maintained constant. The flow rate ratio of hydrogen before and after correction in the MFC represents the change in actual flow rate due to change in ratio between orthohydrogen and parahydrogen in the flowing hydrogen. Therefore, by also correcting the flow rate of hydrogen supplied to the cladding deposition burner after flow rate control by the MFC at the same ratio, the actual flow rate of hydrogen supplied to the cladding deposition burner can also be maintained substantially constant. This helps manufacture products of manufacture having stable characteristics.

$SiCl_4$ and $GeCl_4$ are supplied by direct vaporization by heating them to a temperature that is the same as or higher than the boiling point. By adopting this method, any concentration of material gas can be accurately obtained. It is also possible to supply the gas by diluting it by another gas (e.g., He), so as to prevent the gas to be condensed before reaching the burner to lead to return to its liquid form. $SiCl_4$ and $GeCl_4$ can also be supplied by vaporizing them by bubbling them in the carrier gas. However, this method may not be desirable because the raw material gas concentration in the mixture of carrier gas and raw material gas is easily affected by the atmospheric pressure.

Figure 3:
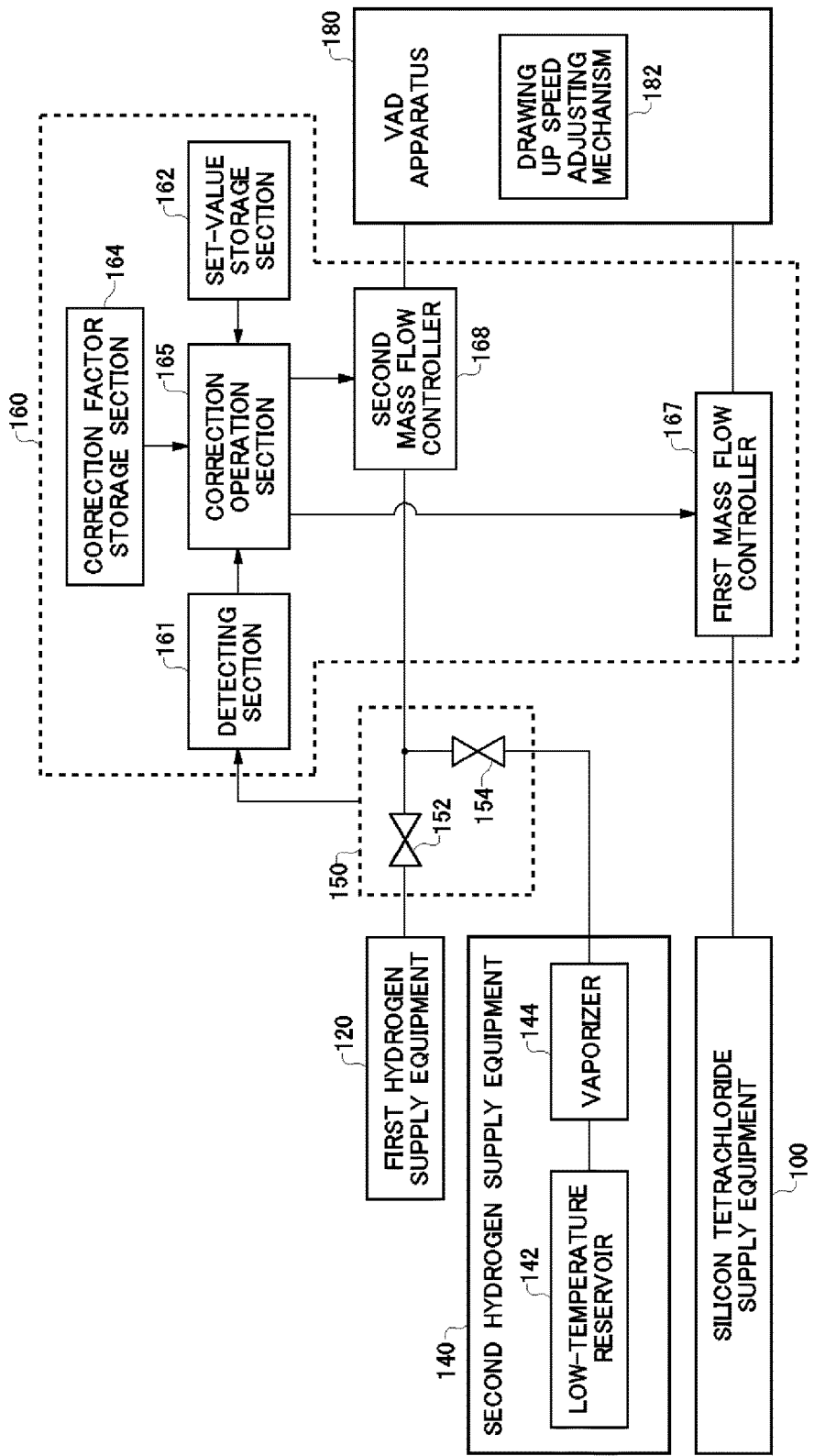
FIG. 3 shows an exemplary concrete configuration of an optical fiber base material manufacturing apparatus according to the present embodiment.

FIG. 3 shows an exemplary concrete configuration of an optical fiber base material manufacturing apparatus 10 according to the present embodiment. The optical fiber base material manufacturing apparatus 10 includes silicon tetrachloride supply equipment 100, first hydrogen supply equipment 120, second hydrogen supply equipment 140, a hydrogen supply source switch device 150, a control apparatus 160, and a VAD apparatus 180. The optical fiber base material manufacturing apparatus 10 manufactures an optical fiber base material by sequentially depositing glass particles on the tip of a starting material drawn up while being rotated in a VAD method.

The silicon tetrachloride supply equipment 100 supplies silicon tetrachloride (SiCl$_4$) to the VAD apparatus 180. The first hydrogen supply equipment 120 supplies hydrogen produced or stored at normal temperature to the burner(s) of the VAD apparatus 180. The second hydrogen supply equipment 140, provided with a low-temperature reservoir 142 and a vaporizer 144, vaporizes the liquid hydrogen stored in the low-temperature reservoir 142 by means of the vaporizer 144, and supplies the result to the burners of the VAD apparatus 180. The hydrogen supplied from the second hydrogen supply equipment 140 may be used as backup hydrogen of the hydrogen supplied from the first hydrogen supply equipment 120. The hydrogen supply switch device 150 switches the supply source of hydrogen to the VAD apparatus 180, between the first hydrogen supply equipment 120 and the second hydrogen supply equipment 140. The hydrogen supply source switch device 150 may include a first valve 152 provided on the hydrogen supply path from the first hydrogen supply equipment 120 and a second valve 154 provided on the hydrogen supply path from the second hydrogen supply equipment 140, for example.

The control apparatus 160 includes a detecting section 161, a set-value storage section 162, a correction factor storage section 164, a correction operation section 165, a first mass flow controller 167, and a second mass flow controller 168. The control apparatus 160 calculates the average of the drawing up speed at each preset time interval, calculates the difference between the calculated drawing up speed average and a preset value of drawing up speed, 1) Mode for correcting the flow rate of silicon tetrachloride supplied to the core deposition burner(s) depending on the difference and 2) Mode for correcting the flow rate of hydrogen supplied to the core deposition burner(s) depending on the difference.

The control apparatus 160 may use 1) Mode for correcting the flow rate of silicon tetrachloride, when the supplied hydrogen is hydrogen produced or stored at normal temperature. When the supplied hydrogen is hydrogen obtained by vaporizing liquid hydrogen, the control apparatus 160 may use 2) Mode for correcting the flow rate of hydrogen. In 2) Mode for correcting the flow rate of hydrogen, the flow rate of hydrogen supplied to the cladding deposition burner can also be corrected in the ratio that is the same as the ratio of before and after the correction of the flow rate of the hydrogen supplied to the core deposition burner(s).

The detecting section 161 detects switching of the supply source of hydrogen between the first hydrogen supply equipment 120 and the second hydrogen supply equipment 140. The detecting section 161 may detect the switching of the supply source of hydrogen, by monitoring which of the first valve 152 and the second valve 154 is open. The detecting section 161 may detect the switching of the supply source of hydrogen, by monitoring the ratio between orthohydrogen and parahydrogen in the hydrogen supplied to the second mass flow controller 168.

The set-value storage section 162 stores the set value of the flow rate of either hydrogen or silicon tetrachloride. The correction factor storage section 164 stores correction factors used for correcting the flow rates of hydrogen or silicon tetrachloride supplied to the core deposition burner(s). In 1) Mode for correcting the flow rate of silicon tetrachloride supplied to the core deposition burner(s), the correction operation section 165 may set, to the first mass flow controller 167, the value obtained by multiplying the flow rate set value of silicon tetrachloride by the factor stored in the correction factor storage section 164, as the set value after correction. In 2) Mode for correcting the flow rate of hydrogen supplied to the core deposition burner(s), the correction operation section 165 may set, to the second mass flow controller 168, the value obtained by multiplying the flow rate set value of hydrogen by the factor stored in the correction factor storage section 164, as the set value after correction.

The first mass flow controller 167 measures the flow rate of silicon tetrachloride, and controls the flow rate to match the set value. The second mass flow controller 168 measures the flow rate of hydrogen, and controls the flow rate to match the set value. Here, the desirable measurement principle of the first mass flow controller 167 and the second mass flow controller 168 may desirably be based on the thermal capacity measurement of gas.

The VAD apparatus 180 includes core deposition burner(s) and a cladding deposition burner, and subject, to reaction, silicon tetrachloride and hydrogen having been supplied, thereby depositing glass particles. The drawing up speed adjusting mechanism 182 adjusts the drawing up speed in accordance with the growth of the base material, so that the tip position of the deposition always remain at the same position.

The following are Embodiment Example(s) and Comparison Example(s) to describe the embodiment(s) of the present invention in further detail, which however do not intend to restrict the present invention.

<Embodiment Example(S)>
<Embodiment Example No. 1>

Figure 4:
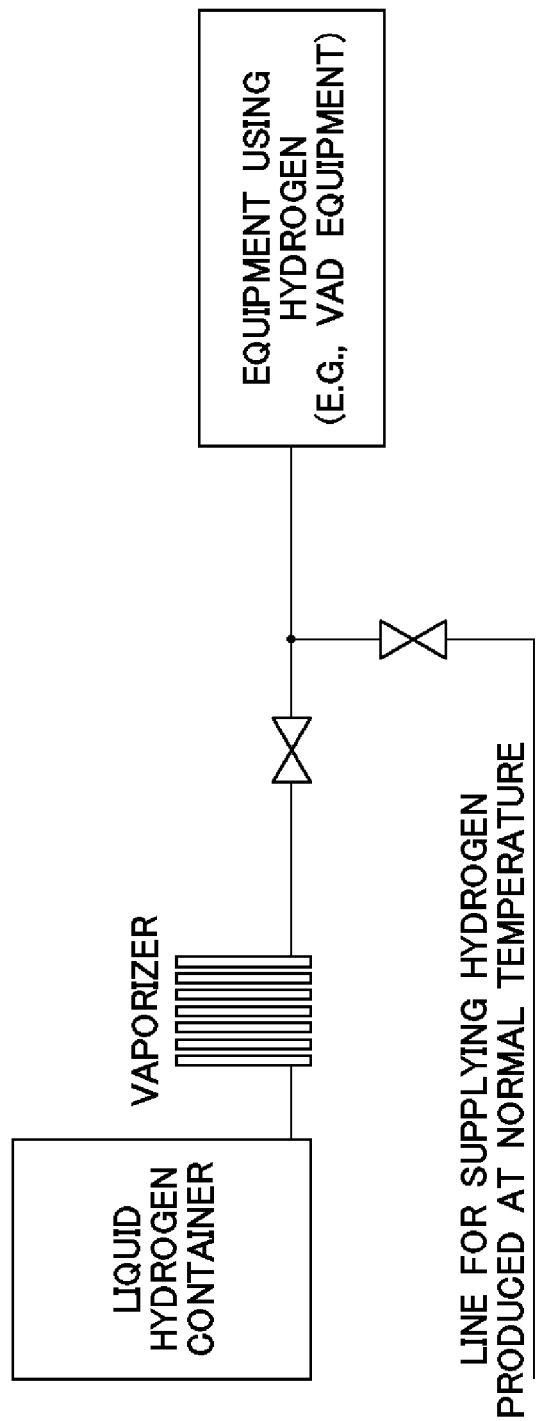
FIG. 4 is a schematic diagram showing hydrogen supply.

As schematically shown in FIG. 4, in the later stage of a hydrogen supply equipment, the pipe for the hydrogen supply equipment is recombined to the pipe that supplies hydrogen produced at normal temperature, to be connected to the equipment that uses hydrogen. The hydrogen supply equipment stores, in the liquid hydrogen container, the liquid hydrogen developed and provided for commercial use, vaporizes the liquid hydrogen by means of the vaporizer to generate a hydrogen gas. The pipe for the liquid hydrogen supply line and the pipe that supplies hydrogen produced at normal temperature are respectively provided with a valve immediately before the junction therebetween, to enable independent use of each of these lines.

Figure 5:
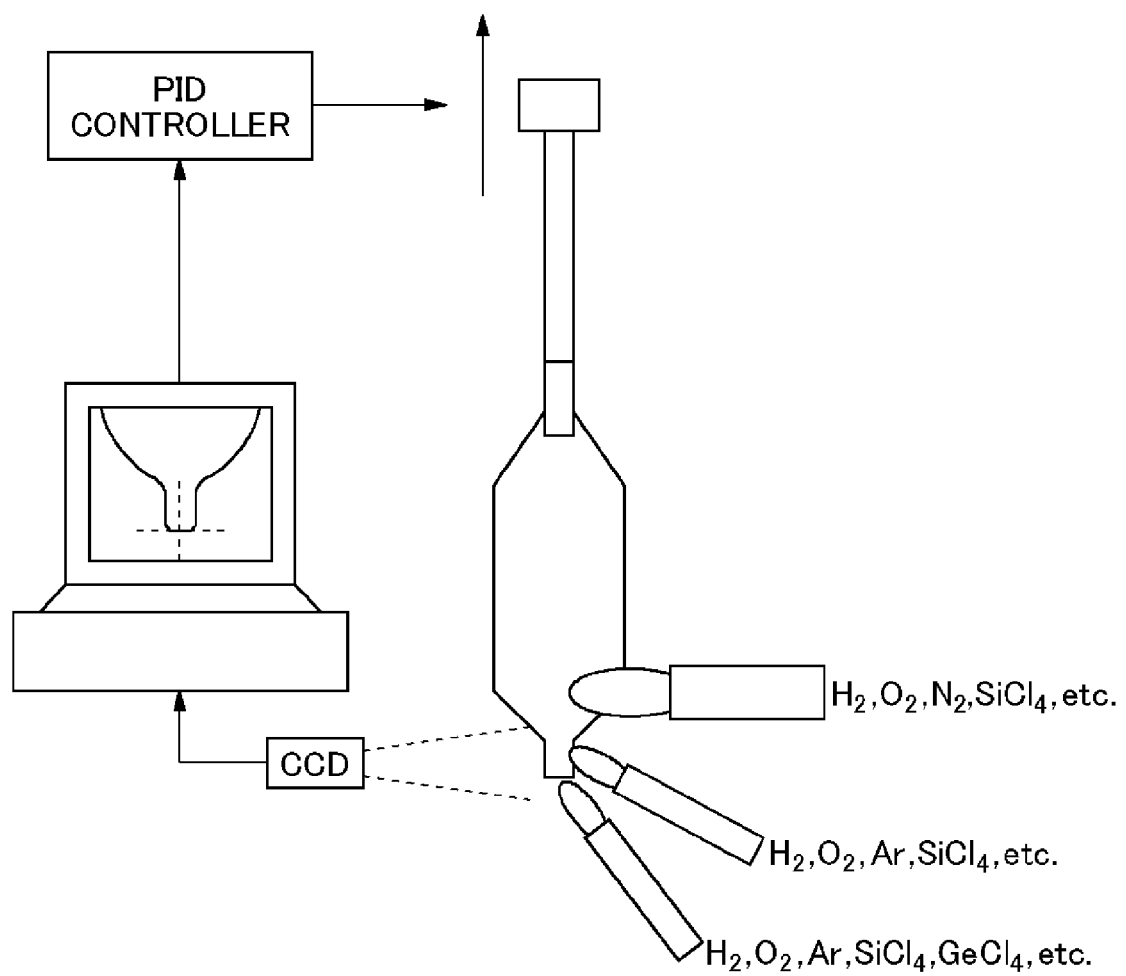
FIG. 5 is a schematic diagram showing an optical fiber base material manufacturing method by a VAD method.

FIG. 5 is an overview of the VAD apparatus used in the present Embodiment Example. The VAD apparatus includes core deposition burners and a cladding deposition burner provided above the core deposition burners. Hydrogen, oxygen, inert gas, and SiCl$_4$ vaporized as a raw material, after controlled their flow rate by the MFC, were supplied to each of the core deposition burners and the cladding deposition burner. As to hydrogen supply for the VAD apparatus, hydrogen produced at normal temperature was supplied by closing the valve at the liquid hydrogen supply line.

SiCl$_4$ supplied in the oxyhydrogen flame is converted into SiO$_2$ by means of hydrolysis, to sequentially deposited on the tip of the target drawn up while being rotated, thereby forming a soot deposition. During the deposition process, a camera (CCD) monitors the vicinity of the tip of the soot deposition, to adjust the drawing up speed by means of the PID controller in accordance with the growth of the soot deposition so as not to lower or raise the tip position. For example, the average of the drawing up speed is calculated at a predetermined time interval (e.g., 20 minutes). Then, the deviation or the difference of the average from the set speed (e.g., 1.00 mm/min) is calculated. In 1) Mode for correcting the flow rate of silicon tetrachloride in proportion to the difference, 0.5% of silicon tetrachloride supplied to the core deposition burners is reduced for every 0.01 mm/min difference value. In 2) Mode for correcting the flow rate of hydrogen in proportion to the difference, the average of the drawing up speed is calculated at each predetermined time interval, and increases 0.5% of hydrogen supplied to the core deposition burner(s) and the cladding deposition burner for every 0.01 mm/min difference value of this average from the set speed which is set to be 1.0 mm/min.

Figure 6:
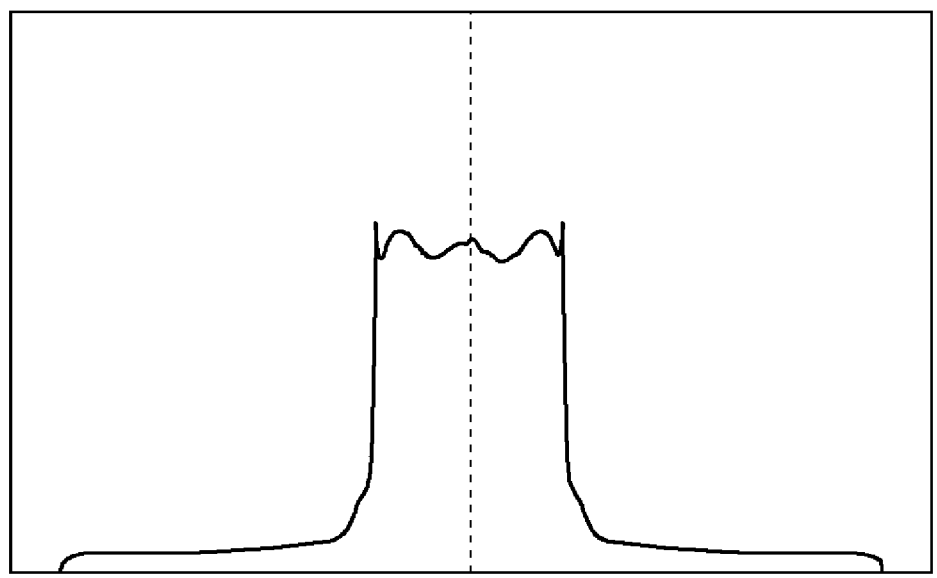
FIG. 6 is an overview of a refractive index distribution of an optical fiber base material manufactured by a VAD method, where the longitudinal axis represents the relative refractive index difference and the lateral axis represents the position in the diameter direction of the preform.

Note that $GeCl_4$ is also supplied to the lower core deposition burner in addition to $SiCl_4$. $GeCl_4$ undergoes flame hydrolysis to generate $GeO_2$, which enhances the refractive index of the quartz glass that is a final product. By supplying $GeCl_4$ only to the core burner(s), only the core will have an increased refractive index, which leads to manufacturing of an optical fiber preform having the refractive index distribution useful as an optical fiber as depicted in FIG. 6. In this drawing, the longitudinal axis represents a relative refractive index difference and the lateral axis represents the position in the diameter direction of the preform.

Figure 7A:
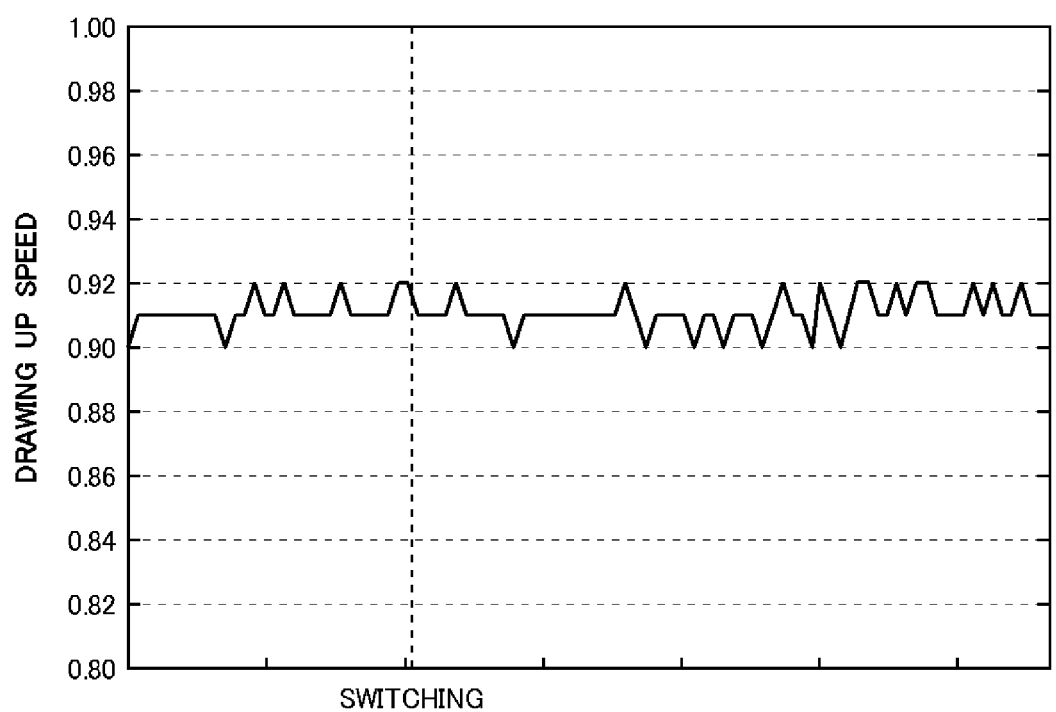
FIG. 7A shows the change in drawing up speed when the hydrogen supplied to the optical fiber base material manufacturing apparatus adopting a VAD method is changed from the hydrogen produced at normal temperature to the hydrogen obtained by vaporizing liquid hydrogen, where the longitudinal axis represents the drawing up speed of soot deposition in mm/min, and the lateral axis represents the time progressing from left to right, with the scale division of 2.4 hours.
Figure 7B:
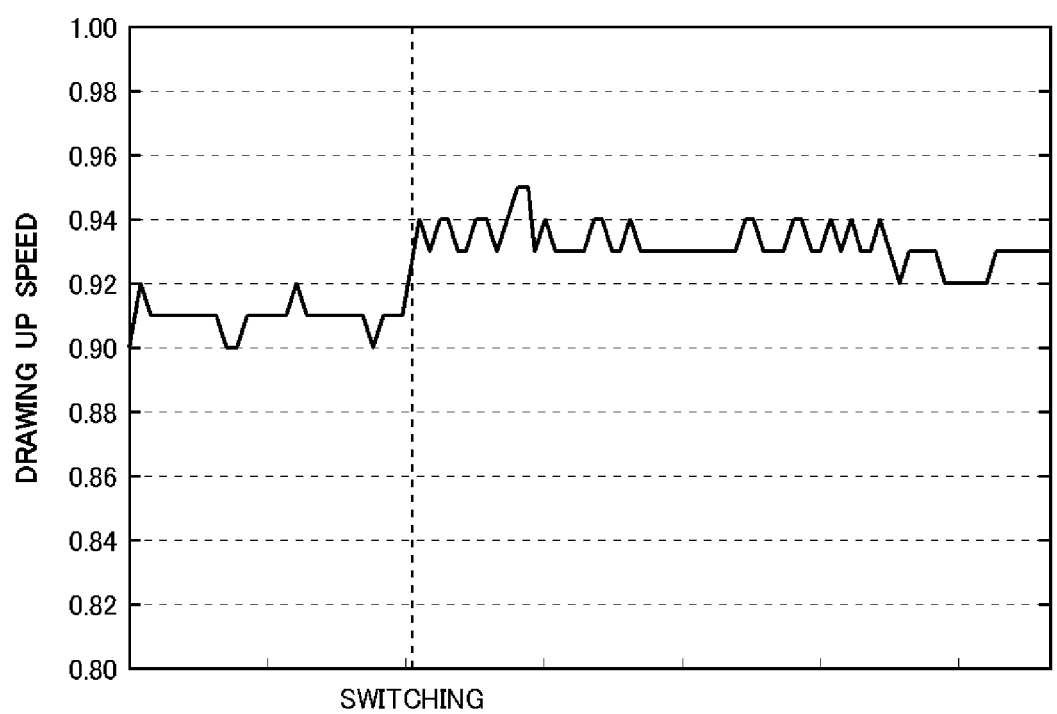
FIG. 7B shows the change in drawing up speed in Comparison Example No.

An optical fiber preform is started to be manufactured by using hydrogen produced at normal temperature, and as the progress of the manufacturing process to some extent, the supply of hydrogen to the core deposition burners and the cladding deposition burner is switched from the hydrogen produced at normal temperature to hydrogen obtained by vaporizing liquid hydrogen. At the same time, the mode is switched from 1) Mode for correcting the flow rate of silicon tetrachloride to 2) Mode for correcting the flow rate of hydrogen. As a result, the actual flow rate did not change compared to before the switching, and the drawing up speed does not show the sign of abnormality after the switching as shown in FIG. 7A. In fact, the optical fiber preform obtained by vitrifying the soot deposition into transparent glass has shown stable optical characteristics in the lengthwise direction. In FIG. 7A and FIG. 7B, the longitudinal axis represents the drawing up speed of soot deposition in mm/min, and the lateral axis represents the time progressing from left to right, with the scale division of 2.4 hours.

<Comparison Example No. 1>

An optical fiber preform was manufactured in the same manner as in Embodiment Example No. 1, except that the flow rate of hydrogen was not corrected at the time of switching the hydrogen produced at normal temperature to the hydrogen obtained by vaporizing liquid hydrogen. As a result, the actual flow rate of hydrogen changed after the switching of hydrogen compared to before the switching, to result in 2% increase in drawing up speed as depicted in FIG. 7B. When thus obtained soot deposition was vitrified into transparent glass, fluctuation was found in the refractive index distribution, the core diameter, and the cladding diameter, to cause the resulting optical fiber perform to be unacceptable as a product of manufacture. Moreover, the soot deposition was cracked in part of the apparatuses, which is considered to be attributable to an abrupt change in density due to rapid change in actual flow rate in hydrogen after the switching compared to before the switching.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, according to an embodiment of the present invention, optical fiber base materials having stable optical characteristics can be obtained with high yields, which contributes to improvement in productivity. In addition, according to an embodiment of the present invention, the actual flow rate of hydrogen can be maintained constant, when switching the hydrogen produced or stored at normal temperature to hydrogen obtained by vaporizing liquid hydrogen, and even in the case of usually using liquid hydrogen and when the supply amount of the liquid hydrogen is changed. Accordingly, the present invention has an distinguished and excellent effect of obtaining an optical fiber base material having a stable core diameter in the lengthwise direction and a desirable refractive index distribution.

What is claimed is:

1. An optical fiber base material manufacturing method for depositing glass particles on a tip of a starting material drawn up while being rotated in a VAD method, the optical fiber base material manufacturing method comprising:
   supplying oxygen and silicide to a core deposition burner;
   supplying a first hydrogen having a ratio of orthohydrogen to parahydrogen of 3:1 or supplying a second hydrogen having a ratio of orthohydrogen to parahydrogen that is different from the ratio of the first hydrogen to the core deposition burner;
   depositing, on the tip of the starting material, silicon dioxide generated in an oxyhydrogen flame by hydrolysis;
   adjusting a drawing up speed so that a deposition tip position remains at the same position in accordance with growth of a porous base material;
   calculating an average of the drawing up speed at each of a plurality of time intervals;
   calculating a difference between i) the calculated average at a time interval from among the plurality of time intervals and ii) a preset value of the drawing up speed;
   during said supplying the first hydrogen, changing a flow rate of the silicide supplied to the core deposition burner in proportion to the difference; and
   during said supplying the second hydrogen, changing a flow rate of the second hydrogen supplied to the core deposition burner in proportion to the difference and changing a flow rate of the second hydrogen supplied to a cladding deposition burner in proportion to the difference.

2. The optical fiber base material manufacturing method according to claim 1, wherein
   a germanium compound is added to the core deposition burner as an additive.

3. The optical fiber base material manufacturing method according to claim 2, wherein
the germanium compound is obtained by heating, to be vaporized, germanium tetrachloride to a temperature that is the same as or higher than a boiling point.

4. The optical fiber base material manufacturing method according to claim 1, wherein
the silicide is obtained by heating, to be vaporized, silicon tetrachloride to a temperature that is the same as or higher than a boiling point.

5. The optical fiber base material manufacturing method according to claim 1, further comprising:
during said supplying the first hydrogen, supplying the first hydrogen to the cladding deposition burner; and
during said supplying the second hydrogen, supplying the second hydrogen to the cladding deposition burner.

6. The optical fiber base material manufacturing method according to claim 5, wherein
the flow rates of the hydrogen supplied to both the core deposition burner and the cladding deposition burner are controlled by a flow rate control apparatus having a measurement principle based on thermal capacity measurement of gas.

7. The optical fiber base material manufacturing method according to claim 6, wherein
the flow rate control apparatus whose measurement principle is based on thermal capacity measurement of gas is a mass flow controller.

8. An optical fiber base material manufacturing method for depositing glass particles on a tip of a starting material drawn up while being rotated in a VAD method, the optical fiber base material manufacturing method comprising:
storing a first hydrogen having a ratio of orthohydrogen to parahydrogen of 3:1;
storing a second hydrogen having a ratio of orthohydrogen to parahydrogen that is different from the ratio of the first hydrogen;
vaporizing the second hydrogen;
supplying the first hydrogen or supplying the second hydrogen to a core deposition burner via a hydrogen supply source switch;
supplying oxygen to the core deposition burner;
supplying silicide to the core deposition burner;
depositing, on the tip of the starting material, silicon dioxide generated in an oxyhydrogen flame by means of hydrolysis;
adjusting a drawing up speed so that a deposition tip position remains at the same position in accordance with growth of a porous base material;
calculating an average of the drawing up speed at each of a plurality of time intervals;
calculating a difference between i) the calculated average at a time interval from among the plurality of time intervals and ii) a preset value of the drawing up speed;
switching the hydrogen supply source switch to be in a first state in which the first hydrogen is supplied to the core deposition burner;
while the hydrogen supply source switch is in the first state, changing a flow rate of the silicide supplied to the core deposition burner in proportion to the difference;
switching the hydrogen supply source switch to be in a second state in which the second hydrogen is supplied to the core deposition burner; and
while the hydrogen supply source switch is in the second state, changing a flow rate of the second hydrogen supplied to the core deposition burner in proportion to the difference and changing a flow rate of hydrogen supplied to a cladding deposition burner in proportion to the difference.

9. The optical fiber base material manufacturing method according to claim 8, wherein
a germanium compound is added to the core deposition burner as an additive.

10. The optical fiber base material manufacturing method according to claim 9, wherein
the germanium compound is obtained by heating, to be vaporized, germanium tetrachloride to a temperature that is the same as or higher than a boiling point.

11. The optical fiber base material manufacturing method according to claim 8, wherein
the silicide is obtained by heating, to be vaporized, silicon tetrachloride to a temperature that is the same as or higher than a boiling point.

12. The optical fiber base material manufacturing method according to claim 8, further comprising:
while the hydrogen supply source switch is in the first state, supplying the first hydrogen to the cladding deposition burner; and
while the hydrogen supply source switch is in the second state, supplying the second hydrogen to the cladding deposition burner.

13. The optical fiber base material manufacturing method according to claim 12, wherein
the flow rates of the hydrogen supplied to both the core deposition burner and the cladding deposition burner are controlled by a flow rate control apparatus having a measurement principle based on thermal capacity measurement of gas.

14. The optical fiber base material manufacturing method according to claim 13, wherein
the flow rate control apparatus whose measurement principle is based on thermal capacity measurement of gas is a mass flow controller.

15. An optical fiber base material manufacturing method for depositing glass particles on a tip of a starting material drawn up while being rotated in a VAD method, the optical fiber base material manufacturing method comprising:
supplying oxygen, hydrogen, and silicide to a core deposition burner, the hydrogen supplied from a first hydrogen source having a ratio of orthohydrogen to parahydrogen of 3:1;
depositing, on the tip of the starting material, silicon dioxide generated in an oxyhydrogen flame by means of hydrolysis;
adjusting a drawing up speed so that a deposition tip position remains at the same position in accordance with growth of a porous base material;
calculating an average of the drawing up speed at each of a plurality of time intervals;
calculating a difference between i) the calculated average at a time interval from among the plurality of time intervals and ii) a preset value of the drawing up speed;
changing a flow rate of the silicide supplied to the core deposition burner in proportion to the difference;
switching from the first hydrogen source to a second hydrogen source having a ratio of orthohydrogen to parahydrogen that is different from the ratio of the first hydrogen source; and
changing a flow rate of the hydrogen supplied to the core deposition burner from the second hydrogen source in proportion to the difference and changing a flow rate of hydrogen supplied to a cladding deposition burner from the second hydrogen source in proportion to the difference.

16. The optical fiber base material manufacturing method according to claim 15, wherein
a germanium compound is added to the core deposition burner as an additive.

17. The optical fiber base material manufacturing method according to claim 16, wherein
the germanium compound is obtained by heating, to be vaporized, germanium tetrachloride to a temperature that is the same as or higher than a boiling point.

18. The optical fiber base material manufacturing method according to claim 15, wherein
the silicide is obtained by heating, to be vaporized, silicon tetrachloride to a temperature that is the same as or higher than a boiling point.

19. The optical fiber base material manufacturing method according to claim 15, wherein
the flow rates of the hydrogen both supplied to the core deposition burner and the cladding deposition burner are controlled by a flow rate control apparatus having a measurement principle based on thermal capacity measurement of gas.

20. The optical fiber base material manufacturing method according to claim 19, wherein
the flow rate control apparatus whose measurement principle is based on thermal capacity measurement of gas is a mass flow controller.

* * * * *